United States Patent
Dümig et al.

(10) Patent No.: US 8,770,867 B2
(45) Date of Patent: Jul. 8, 2014

(54) LIFTING UNIT FOR PIPE INSPECTION SYSTEMS

(71) Applicant: iPEK International GmbH, Sulzberg (DE)

(72) Inventors: Christian James Dümig, Waltenhofen (DE); Alexander Kreutzer, Sonthofen (DE)

(73) Assignee: iPEK International GmbH, Sulzberg (DE)

(*) Notice: Subject to any disclaimer, the term of this patent is extended or adjusted under 35 U.S.C. 154(b) by 0 days.

(21) Appl. No.: 14/035,024

(22) Filed: Sep. 24, 2013

(65) Prior Publication Data
US 2014/0023358 A1 Jan. 23, 2014

Related U.S. Application Data

(63) Continuation of application No. PCT/EP2012/055265, filed on Mar. 23, 2012.

(30) Foreign Application Priority Data

Mar. 24, 2011 (DE) .................. 10 2011 015 080

(51) Int. Cl.
*G03B 17/00* (2006.01)
(52) U.S. Cl.
USPC ......................................................... 396/428
(58) Field of Classification Search
CPC ............ F16L 55/26; F16L 55/48; F16L 55/28
USPC ......................................................... 396/428
See application file for complete search history.

(56) References Cited

U.S. PATENT DOCUMENTS

| 3,964,171 | A | * | 6/1976 | Gambini et al. | 33/544.2 |
| 7,131,344 | B2 | * | 11/2006 | Tarumi | 73/865.8 |
| 7,460,980 | B2 | * | 12/2008 | Hinn | 702/151 |
| 8,442,721 | B2 | * | 5/2013 | Yi et al. | 701/41 |
| 2011/0196534 | A1 | * | 8/2011 | Ekes et al. | 700/259 |
| 2012/0069172 | A1 | * | 3/2012 | Hudritsch | 348/84 |

FOREIGN PATENT DOCUMENTS

| DE | 93 08 552 U1 | 9/1993 |
| DE | 202009010442 U1 | 9/2010 |
| WO | 2006/000271 A1 | 1/2006 |

OTHER PUBLICATIONS

CCTV Re-Envisioned—From the ground up!, Supervison, Brochure, iPek, 2011.*
Starten Sie Mit wachsendom Potential, Rovion, Brochure, iPek, 2011.*
iPek: Supervision, www.ipek.at (May 23, 2008).*
International Search Report for corresponding International Application No. PCT/EP2012/055265, Mailed Jun. 13, 2012.

* cited by examiner

*Primary Examiner* — Rodney Fuller
(74) *Attorney, Agent, or Firm* — Myers Wolin, LLC

(57) ABSTRACT

A lifting unit for pipe inspection systems for lifting a head unit, comprising a base support with a connection module for connection to a connection unit of a carriage, a lifting system with at least one lifting arm and a drive unit for deflecting the lifting arm relative to the base support via a rotation axis, as well as a head unit with a connection module for connection of inspection units, in particular cameras and illumination systems, wherein connectors of the carriage are at least partially lead to the connection module of the head unit.

10 Claims, 5 Drawing Sheets

LIFTING UNIT FOR PIPE INSPECTION SYSTEMS

CROSS-REFERENCE TO RELATED APPLICATIONS

This application is a continuation under 35 U.S.C. §120 of International Application PCT/EP2012/055265, filed Mar. 23, 2012, which claims priority to DE Application 10 2011 015 080.3, filed Mar. 24, 2011, the contents of each of which are incorporated by reference herein.

FIELD OF THE INVENTION

The invention relates to a lifting unit for pipe inspection systems for lifting a head unit.

BACKGROUND

In prior art, pipe inspection systems with a carriage are known in which a camera unit is fixed to the lifting unit, which is able to lift the camera above the carriage. This, in particular, is necessary, if pipes are to be inspected by means of cameras, which have a larger diameter than the pipe inspection system, because for inspection, it is especially advantageous, if the optical axis of the camera substantially lies in the central longitudinal axis of the pipe to be inspected.

Such pipe inspection systems are disadvantageous in that they are comparably large and, thus, are not suitable for smaller pipes, but, first of all, are complex, expensive, and comparably inflexible. Thus, the invention is based on the object to provide a device, which offers the advantages of the prior art and avoids the disadvantages.

SUMMARY

This object is solved by a lifting unit for a pipe inspection system having a base support with a connection module for connection to a connection unit of a carriage, a lifting system with at least one lifting arm, and a drive unit for deflecting the lifting arm against the base support via a rotation axis, as well as a head unit with a connection module for connection of inspection units, in particular, cameras and illumination systems, wherein connectors of the carriage are directed at least partially to the connection module of the head unit. It is advantageous, if the connection module of the head unit corresponds to the connection unit of the carriage and/or the drive unit for deflection of the lifting arm has a motor, which is located in one of at least two lifting arms, wherein advantageously, the driving for deflection of the lifting arm is carried out electrically, and the drive unit is supplied with energy via the connecting unit of the carriage. Alternatively, the driving for deflection of the lifting arm may be carried out mechanically via a shaft, which is driven via a connector at the carriage.

It is beneficial, if the connection module of the lifting unit has a plug, preferably with quick lock, and if at least one additional connector for receiving and control of auxiliary modules, preferably of additional illumination modules, is present at the head unit, preferably in the upper region.

Also disclosed is a carriage for a pipe inspection system having a connector for receiving of a control and supply cable in the rearward region, a connection unit in the front part, preferably for receiving of a pivotable camera head, wherein the carriage has fixtures for a lifting unit according to one of the preceding embodiments. Preferably, thereby the connection module provides control and power supply cables, by means of which the drive unit and further modules connected to the lifting unit may be controlled besides the pivotable camera head.

Such a carriage, amongst others, has the advantage that it may be configured in a comparably compact manner, but at the same time provides an efficient, particularly versatile pipe inspection unit in connection with the lifting part. For the user, this has the additional advantage that it requires less complete systems, because by means of the inventive system, he is provided with a modular arrangement, wherein he does not require all of the available modules at the same time. Because further accessories, for example, additional illumination units or measurement devices, may be attached to the head part of the lifting system via an additional connector not further described, the system is rendered even more efficient and versatile.

It is especially advantageous, if the carriage additionally has a camera and an illumination device in the rearward region of the carriage, preferably respectively adjacent to the connector for the supply cable. This enables a secure navigation, also when driving backwards.

Finally, a carriage for a pipe inspection system is disclosed having a connector for receiving of a control and supply cable in the rearward region, a connection unit in the front part, preferably for receiving a pivotable camera head which additionally has a temperature sensor for measuring the ambient temperature, wherein the temperature sensor preferably comprises germanium for the detection of heat radiation.

Eventually, a camera head for pipe inspection systems with connection module for use with the lifting unit or a carriage mentioned above is disclosed, wherein the camera head preferably in its pivot/rotation axis has a cross shaft bearing in order to enable a particularly compact construction.

BRIEF DESCRIPTION OF THE DRAWINGS

The invention is described below by means of an embodiment.

DETAILED DESCRIPTION

Figure 1:
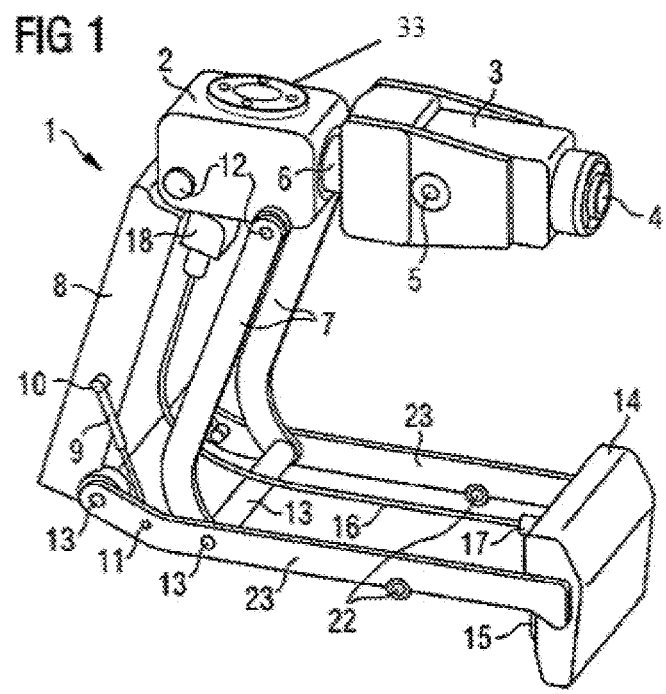
FIG. 1 shows a lifting system with a camera head attached to the head unit.

FIG. 1 shows a lifting system 1 according to the invention with a head part 2, to which a camera head 3 is connected via a connection module 6 having quick lock. The camera head has an entrance lens 4 and a central pivot axis 5. The rotation axis about which the camera head is rotatable around its longitudinal axis, and which preferably has a cross shaft bearing, is not shown in FIG. 1.

The head part is connected to two front lifting arms 7 at its exterior sides, which in turn are connected to the base support 23. The rear lifting arm 8 in its interior has an electrical unit, which in particular comprises a motor, via which the telescope arm 9 may be moved in and out. The telescope arm 9 is connected to the rear lifting arm 8 as well as to the base support 23 via an upper rotation point 10 and a lower rotation point 11. The lifting arms 7, 8 respectively are connected via upper rotation axes 12 and lower rotation axes 13, on the one hand, to the head part 2 and, on the other hand, to the base support 23. By means of the driven telescope arm 9, the head part 2 may be pivoted by the lifting arms 7, 8 from the upper position shown downwards to the front. In the lower end position not shown, the camera head 3 lies in front of the front part 14 of the base support 23. The base support 23 has front connection points 22 corresponding to respective mounts 22' shown, e.g., in FIG. 4.

The mounting of the drive unit for the lifting unit within the lifting unit saves space in the carriage and enables to design the latter particularly compact. As far as there is a little bit more space in the carriage, alternatively, it is however possible to drive a shaft within the carriage, which is lead outwards, and which drives the lifting system directly. With this variant, the lifting system may be built more lean and lighter.

Figure 4:
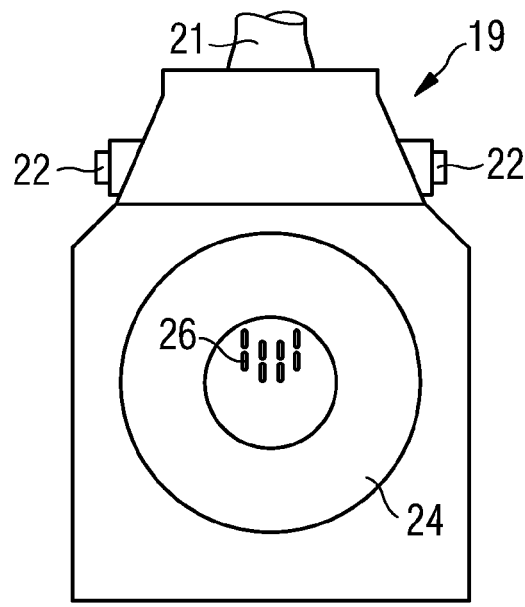
FIG. 4 shows a front view of a carriage according to FIG. 3.

At the front part 14 of the base support 23, a connection module, here a plug 15, is provided, which mates to a corresponding connection module 24 of a carriage 19. FIG. 4 shows a front view of a carriage 19 with a connection module 24, which is configured as a sleeve, in the interior of which plug contacts are provided.

The lifting unit 1 shown in FIG. 1 further comprises a cable 16, which is connected to the front part 14 of the base support 23 via a plug 17, and via a plug 18 to the lifting arm 8 comprising the electric control unit. The electrical control and supply terminals of the connection module 24 of the carriage 19 are guided into the electric control unit via the cable 16, and from there, are further directed at least partially into the head part 2 such that the connection module 6 ideally comprises in the head part 2 the same terminals lead there through as the connection module 24 of the carriage 19 such that the camera head 3 including possible auxiliary modules at the lifting unit 1 may be controlled and operated just as it were at the carriage 19. As shown, the head part 2 may contain at least one additional connector 33 on the upper surface for receiving and control of auxiliary modules, such as additional illumination modules.

Figure 2:
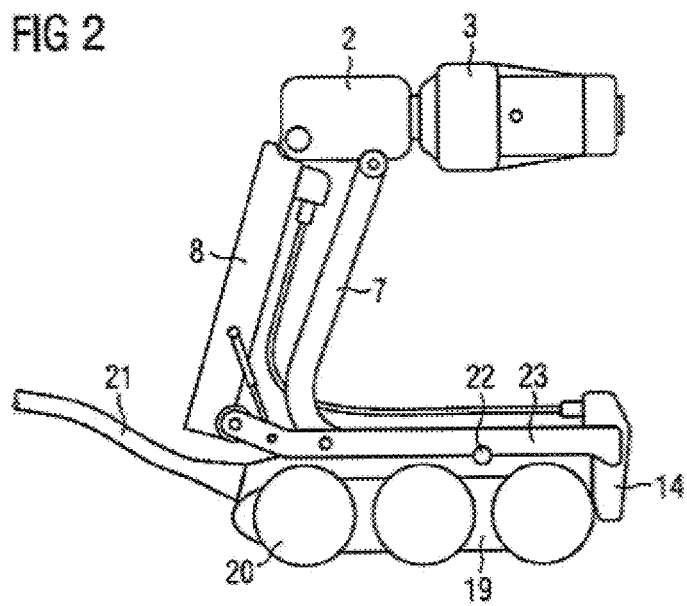
FIG. 2 shows a lifting system according to FIG. 1 mounted on a carriage.

FIG. 2 shows a lifting unit of FIG. 1 with lifting arms 7, 8, head part 2, camera head 3, and base support 23 mounted at a carriage 19 via a front mount 22. The front connection module of the lifting unit, thereby, is connected via the front part 14—not shown here—to the connection module of the carriage 19. The carriage 19 is supplied with power and control commands via a cable 21 in the rear region of the carriage 19. The motor of the carriage 19 drives the wheels 20 in a manner known in the art.

Figure 3:
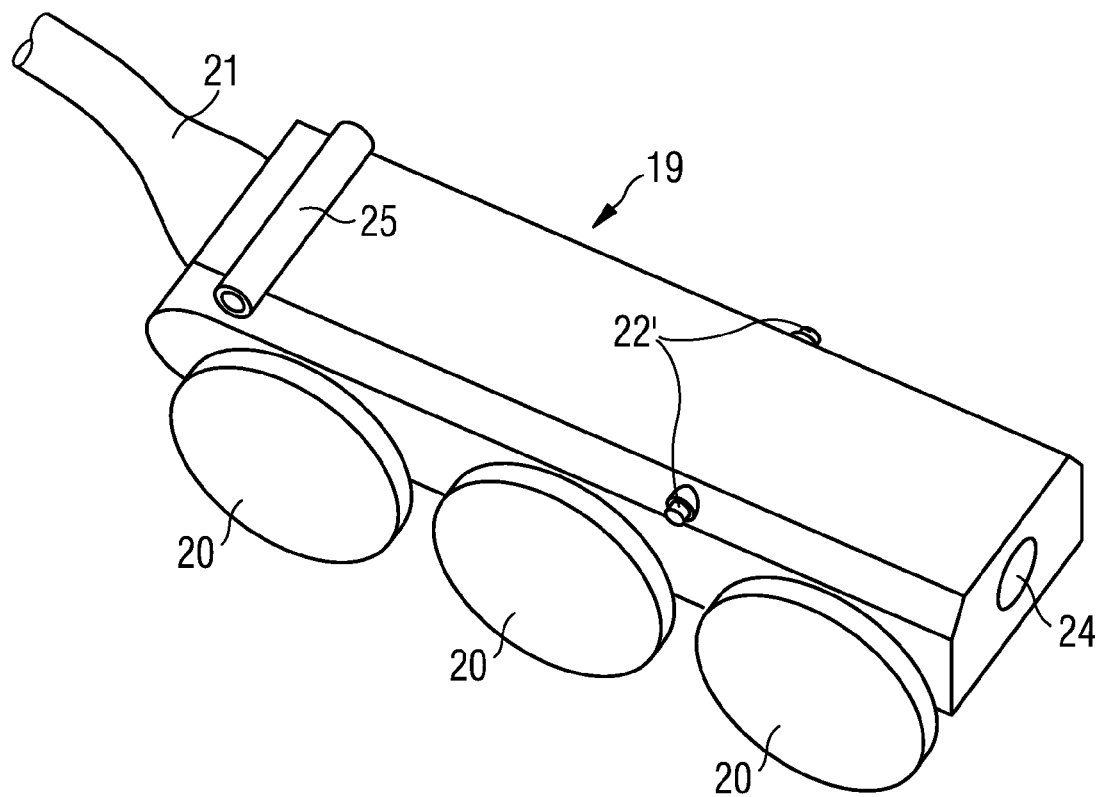
FIG. 3 shows a carriage for receiving a lifting system according to FIG.1.

FIG. 3 shows the carriage 19 without lifting unit and camera head. The control and supply cable 21, the wheels 20, and the front connection module 24 can be seen. Moreover, the front mounts 22' for the reception and fixation of the base support 23 is shown. The base support 23 may be fixed additionally by a rear mount 25, which here is configured as a groove.

In a further embodiment, the wheels 20 are easily removable such that a mounting comprising a frame with wheels attached to the bottom, which are driven by the axes of the carriage 19 coupled to the top, may be coupled. Thereby, the carriage may be lifted altogether avoiding either the use of the lifting unit for known pipe diameters, or enables to inspect even larger pipe diameters by means of the lifting unit. In practical tests, it has been found feasible to inspect pipes with inner diameters between 150 and 1000 mm. For such applications, in prior art, a plurality of individual systems has been necessary.

Also not shown is an embodiment according to which the carriage 19 has a temperature sensor. The temperature sensor preferably is made from germanium, and thus is particularly suited to measure heat radiation. It should be understood that the temperature sensor also may be attached to the lifting unit or to the camera head.

The measurement of ambient temperatures, for example, is interesting for the interior of waste disposal sites, but also in all other surroundings, in which gases inflammable at certain temperatures are to be expected. A sensor made from germanium may be inserted into explosion protected units in a particularly tight manner without having to expect spark formation. Moreover, reliable measurements may be carried out within the temperature range of interest by means of such a sensor.

Figure 5:
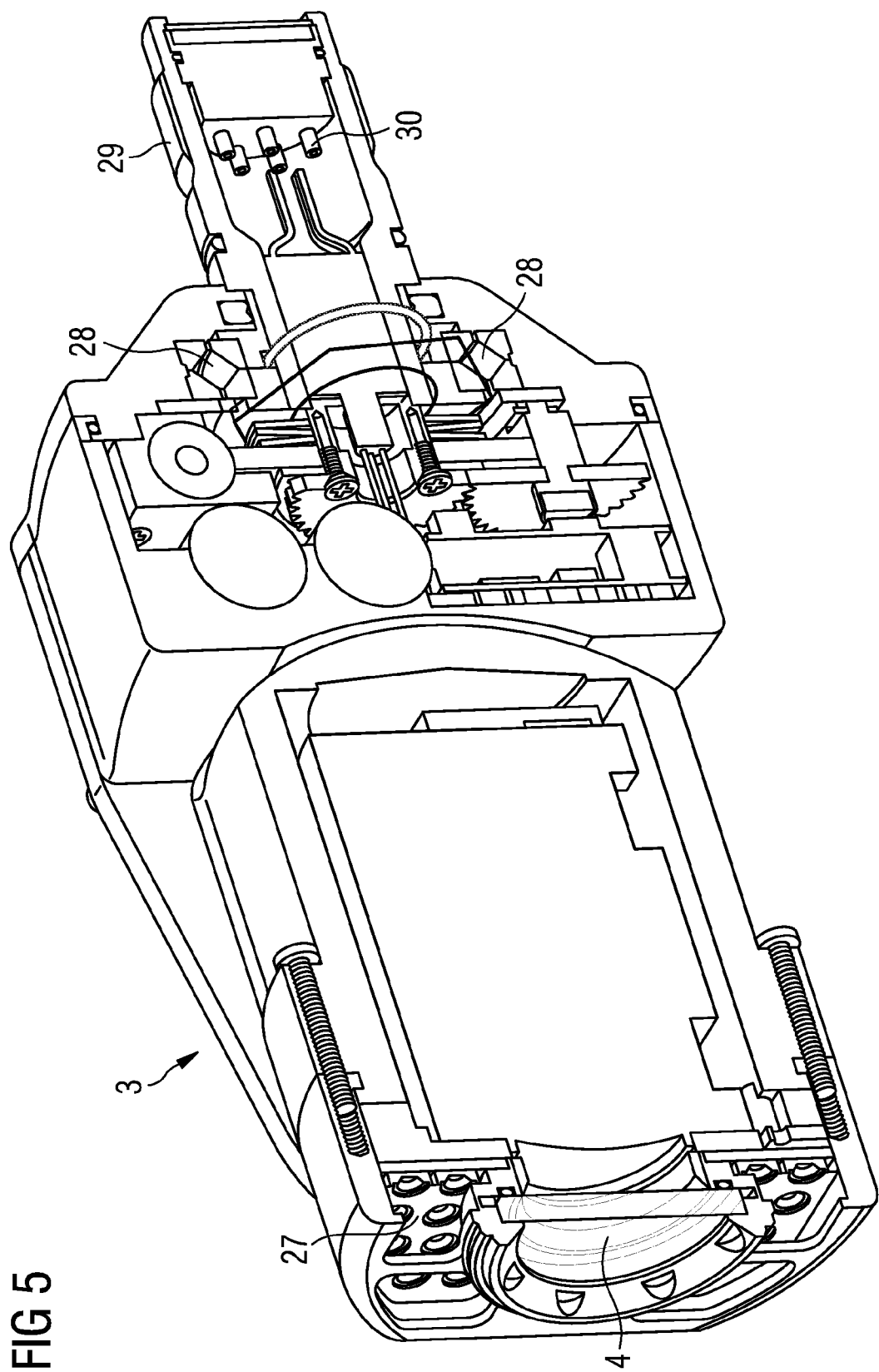
FIG. 5 shows a sectional view of a camera head with cross shaft bearing.

FIG. 5 shows a perspective sectional view through a camera head 3 with an entrance lens 4 in the front and a connection module 29 in the rear region. In the connection module 29, contacts 30 are shown exemplarily, which correspond to the plug contacts 26 in the connection module 24 of the carriage 19 in FIG. 4.

The camera head 3 is supported rotatably around its longitudinal axis. Here, the inventors have found for the first time that it is possible using a cross roller bearing 28 in a camera head for pipe inspection systems. Such a cross roller bearing 28 enables an especially compact construction of the camera head 3.

Figure 6:
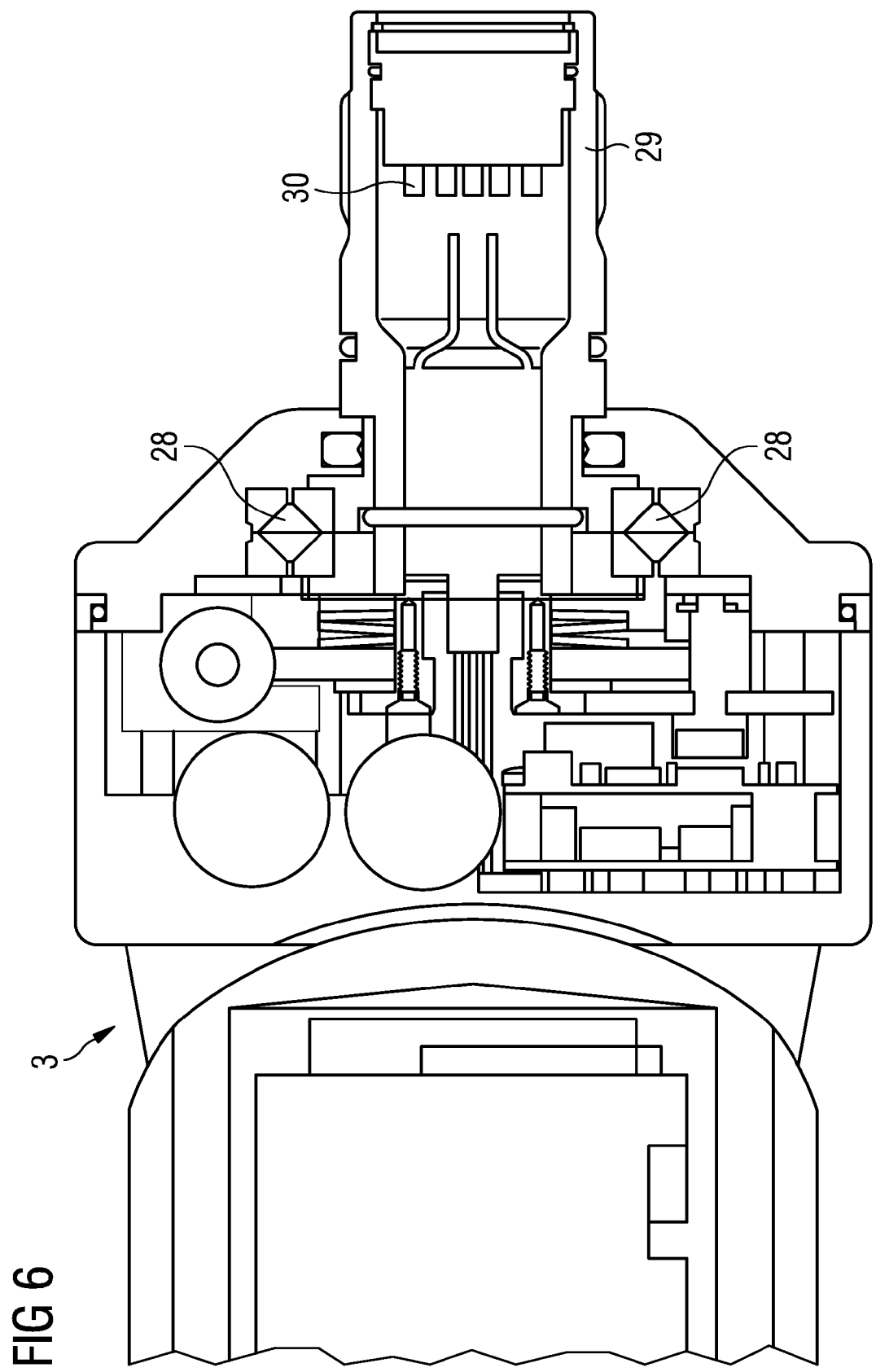
FIG. 6 shows a second sectional view through a camera head according to FIG. 5.

FIG. 6 shows a rear part of the camera head 3 from FIG. 5 in a longitudinal section. In particular, the position of the cross roller bearing 28 can be seen, but also the connection module 29 and the plug contacts 30.

Figure 7:
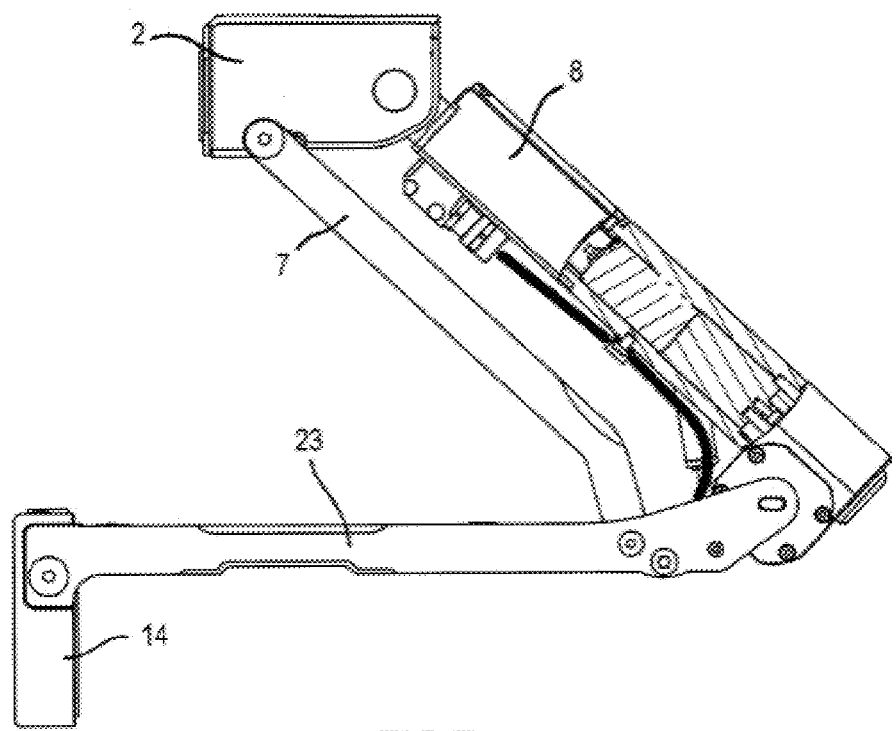
FIG. 7 shows a partially sectioned side view of an embodiment of a lifting system.
Figure 8:
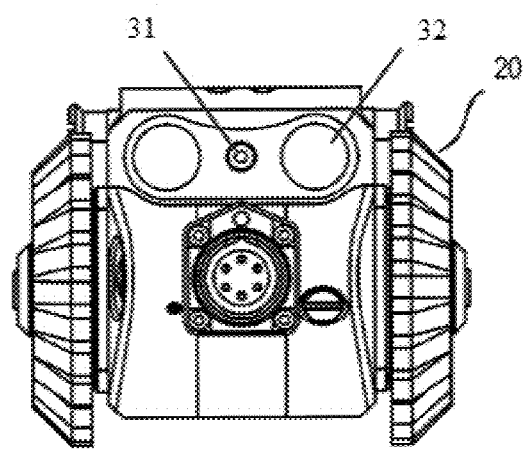
FIG. 8 shows a rear view of an embodiment of a carriage.

FIG. 7 shows a partially sectioned side view of an embodiment of a lifting system. In the embodiment shown, the head part is connected to two front lifting arms 7 at its exterior sides, which in turn are connected to the base support 23. The rear lifting arm 8 in its interior has an electrical unit, which in particular comprises a motor. FIG. 8 shows a rear view of an embodiment of a carriage. In the embodiment shown, the carriage has wheels 20 and additionally has a camera 31 and an illumination device 32 in the rearward region of the carriage, adjacent to the connector for the supply cable.

LIST OF REFERENCE NUMERALS 1 lifting unit
2 head part
3 camera head
4 entrance lens
5 pivot axis camera head
6 connection camera head—head part
7 front lifting arms
8 rear lifting arm with electric control and drive unit
9 telescope arm
10 upper telescope arm
11 lower telescope arm
12 upper lifting arm axes
13 lower lifting arm axes
14 front part of the base support
15 connection module for connection to the carriage
16 cable
17 plug to the front part
18 plug to the head part
19 carriage
20 wheels 21 control and supply cable
22 front mount of the base support (22, 22')
23 base support
24 connection module carriage
25 rear mount base support
26 plug contacts
27 illumination camera head
28 cross shaft bearing
29 connection module camera head
30 sleeves for electric plug contacts

The invention claimed is:

1. A lifting unit for pipe inspection systems for lifting a head unit comprising:
   a base support with a connection module for connection to a connection unit of a carriage,
   a lifting system with at least one lifting arm, and
   a drive unit for deflecting the lifting arm relative to the base support via a rotation axis, as well as a head unit with a connection module for connection of inspection units, in particular, cameras and illumination systems,
   wherein signals at the electrical control and supply terminals of the carriage are at least partially directed to corresponding terminals of the connection module of the head unit.

2. The lifting unit of claim 1, wherein the connection module of the head unit comprises terminal leads corresponding to terminal leads in the connection unit of the carriage.

3. The lifting unit of claim 1, wherein the drive unit for deflecting the lifting arm comprises a motor, which is located in one of at least two lifting arms.

4. The lifting unit of claim 1, wherein the drive unit for deflecting the lifting arm is carried out electrically, and the drive unit is supplied with power by the connection unit of the carriage.

5. The lifting unit of claim 1, wherein the drive unit for deflecting the lifting arm is carried out mechanically by a shaft, which is driven by a connector at the carriage.

6. The lifting unit of claim 1, wherein the connection module of the base support and the connection module of the head unit comprise a plug, preferably a quick lock.

7. The lifting unit of claim 1, comprising at the head unit, preferably in the upper region, at least one additional connector for reception and control of auxiliary modules, preferably of additional illumination modules.

8. A carriage for a pipe inspection system comprising:
   a connector for reception of a control and supply cable in the rearward region, and
   a connection unit in the front part, preferably for reception of a pivotable camera head, wherein the carriage comprises mounts for a lifting unit according to claim 1.

9. The carriage of claim 8, wherein the connection module of the base support provides control and power supply cables, by means of which besides the pivotable camera head, also the drive unit and further modules connected to the lifting unit may be controlled.

10. The carriage of claim 8, further comprising a camera and an illumination device in the rearward region of the carriage, preferably respectively adjacent to the connection for the supply cable.

\* \* \* \* \*